(12) United States Patent
Haibara et al.

(10) Patent No.: US 12,084,089 B2
(45) Date of Patent: Sep. 10, 2024

(54) DRIVING CONTROL DEVICE, STORAGE MEDIUM STORING DRIVING CONTROL PROGRAM, AND DRIVING CONTROL SYSTEM

(71) Applicant: TOYOTA JIDOSHA KABUSHIKI KAISHA, Aichi-ken (JP)

(72) Inventors: Teruaki Haibara, Kanagawa-ken (JP); Kenji Hoshi, Gotemba (JP); Masaaki Sato, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 151 days.

(21) Appl. No.: 17/842,708

(22) Filed: Jun. 16, 2022

(65) Prior Publication Data

US 2022/0402524 A1    Dec. 22, 2022

(30) Foreign Application Priority Data

Jun. 21, 2021 (JP) ................. 2021-102742

(51) Int. Cl.
*B60W 60/00* (2020.01)

(52) U.S. Cl.
CPC ..... *B60W 60/0051* (2020.02); *B60W 2552/00* (2020.02); *B60W 2556/45* (2020.02); *B60W 2720/106* (2013.01)

(58) Field of Classification Search
CPC ......... B60W 60/0051; B60W 2552/00; B60W 2556/45; B60W 2720/106; B60W 60/0025; B60W 60/0011
See application file for complete search history.

(56) References Cited

U.S. PATENT DOCUMENTS

| | | | | |
|---|---|---|---|---|
| 2014/0048104 A1* | 2/2014 | Stadler | ................. | G05D 1/0255 134/18 |
| 2014/0052312 A1* | 2/2014 | Stadler | ................. | B60W 30/06 701/2 |
| 2016/0362089 A1* | 12/2016 | Lapeer | ..................... | B60K 6/00 |
| 2020/0406866 A1 | 12/2020 | Asai | | |
| 2021/0162986 A1 | 6/2021 | Sakai et al. | | |
| 2021/0402986 A1* | 12/2021 | Imai | ...................... | B60W 50/14 |
| 2022/0410849 A1* | 12/2022 | Haibara | ................... | B60S 3/04 |
| 2022/0413485 A1* | 12/2022 | Haibara | ............... | G05D 1/0011 |

FOREIGN PATENT DOCUMENTS

| | | | | | |
|---|---|---|---|---|---|
| CN | 105205499 A | * | 12/2015 | ........... | G06F 16/248 |
| CN | 205353748 U | * | 6/2016 | | |
| CN | 205844523 U | * | 12/2016 | | |
| CN | 106506596 A | * | 3/2017 | | |
| CN | 109334615 A | * | 2/2019 | | |
| CN | 109649340 A | * | 4/2019 | ............... | B60S 3/00 |
| CN | 110271558 A | * | 9/2019 | ............... | B60S 3/04 |
| CN | 113370941 A | * | 9/2021 | | |

(Continued)

*Primary Examiner* — Peter D Nolan
*Assistant Examiner* — Peter Y Ning
(74) *Attorney, Agent, or Firm* — HAUPTMAN HAM, LLP (57) ABSTRACT

A driving control device including a processor. The processor detects that a vehicle has encroached into an area configured for car-washing by a carwash machine, switches a travel mode of the vehicle to autonomous driving, and controls the vehicle so as to stop at a carwash position for the carwash machine under autonomous driving.

11 Claims, 8 Drawing Sheets

(56) References Cited

FOREIGN PATENT DOCUMENTS

| | | | | |
|---|---|---|---|---|
| CN | 116767146 A | * | 9/2023 | |
| DE | 102012217157 A1 | * | 3/2013 | ................ B60J 1/17 |
| JP | 2017214024 A | * | 12/2017 | |
| JP | 2021-005332 A | | 1/2021 | |
| JP | 2021-084560 A | | 6/2021 | |
| JP | 2023029018 A | * | 3/2023 | |
| JP | 7281728 B2 | * | 5/2023 | |
| JP | 7396257 B2 | * | 12/2023 | |
| WO | 2019/181264 A1 | | 9/2019 | |
| WO | WO-2020151188 A1 | * | 7/2020 | ............ B60W 30/06 |

* cited by examiner

DRIVING CONTROL DEVICE, STORAGE MEDIUM STORING DRIVING CONTROL PROGRAM, AND DRIVING CONTROL SYSTEM

CROSS-REFERENCE TO RELATED APPLICATION

This application is based on and claims priority under 35 USC 119 from Japanese Patent Application No. 2021-102742 filed on Jun. 21, 2021, the disclosure of which is incorporated by reference herein.

BACKGROUND

Technical Field

The present disclosure relates to a driving control device, a storage medium storing a driving control program, and a driving control system to stop a vehicle at an appropriate carwash position.

Related Art

Japanese Patent Application Laid-Open (JP-A) No. 2017-214024 discloses a carwash machine for cleaning a car-body surface of a car by moving relative to the car. This carwash machine is able to stop operation or not start operation of the machine itself when confirmed that the car is in an inappropriate state for car-washing from an image transmitted from a camera capable of imaging an area including the carwash machine itself and including a side face of a car stopped at a position where at least car-washing is possible from a front face of the carwash machine itself.

The carwash machine of JP-A No. 2017-214024 is able to stop operation or not start operation of the machine itself, in a case in which a vehicle is confirmed to be in an inappropriate state for car-washing. However, in order to quickly start the car-washing operation of the machine itself there is a need to guide the position of the vehicle to an appropriate carwash position.

SUMMARY

In consideration of the above circumstances, an object of the present disclosure is to provide a driving control device capable of suppressing delay to car-washing in a carwash machine by stopping a vehicle at an appropriate carwash position.

A driving control device of a first aspect includes a processor. The processor is configured to detect that a vehicle has encroached into an area configured for car-washing by a carwash machine, to switch a travel mode of the vehicle to autonomous driving, and to control the vehicle so as to stop at a carwash position for the carwash machine under autonomous driving.

In the driving control device of the first aspect, a detection section detects that a vehicle has encroached into an area configured for car-washing by a carwash machine, a switching section switches a travel mode of the vehicle to autonomous driving, and a control section controls the vehicle so as to stop at a carwash position for the carwash machine under autonomous driving. The driving control device of the first aspect enables delay to car-washing in a carwash machine to be suppressed by stopping a vehicle at an appropriate carwash position.

In a driving control device of a second aspect the processor is further configured to acquire displacement information relating to displacement between the vehicle and the carwash position, in a case in which the vehicle has stopped at a position displaced from the carwash position, and to control the vehicle based on the displacement information so as to stop at the carwash position under autonomous driving.

The driving control device of the second aspect enables correction of the carwash position even in a case in which the vehicle has stopped at a position displaced from the carwash position.

In a driving control device of a third aspect, the processor is further configured to notify the carwash machine of feature information indicating features of the vehicle, and to acquire, from the carwash machine, information derived based on the feature information as information regarding the carwash position that is compatible with the vehicle.

The driving control device of the third aspect enables the carwash machine to be operated more certainly by setting the carwash position based on the features of the vehicle.

In a driving control device of a fourth aspect the processor is further configured to switch the travel mode of the vehicle from autonomous driving to manual driving, in a case in which the vehicle has stopped at a position displaced from the carwash position.

The driving control device of the fourth aspect enables movement to the carwash position under manual driving even in a case in which the vehicle was not able to be stopped at the carwash position under autonomous driving.

In a driving control device of a fifth aspect, the processor is further configured to provide notification to ensure that the vehicle is driven to the carwash position manually, in a case in which the vehicle has stopped at a position displaced from the carwash position.

The driving control device of the fifth aspect enables movement to the carwash position by manual driving to be prompted even in a case in which the vehicle was not able to be stopped at the carwash position under autonomous driving.

A sixth aspect is a non-transitory storage medium storing a driving control program. The program executes a computer to perform processing, the processing comprising detecting that a vehicle has encroached into an area configured for car-washing by a carwash machine, switching a travel mode of the vehicle to autonomous driving, and controlling the vehicle so as to stop at a carwash position for the carwash machine under autonomous driving.

The program stored on the non-transitory recording medium of the sixth aspect enables delay to car-washing in a carwash machine to be suppressed by stopping a vehicle at an appropriate carwash position.

A driving control system of an seventh aspect includes the driving control device of any one of the first to the fifth aspect and a carwash machine. In the driving control system, the carwash machine notifies the vehicle of information derived based on feature information indicating features of the vehicle as information regarding a carwash position that is compatible with the vehicle.

The driving control system of the seventh aspect enables delay to car-washing in a carwash machine to be suppressed by stopping a vehicle at an appropriate carwash position.

A driving control system of an eighth aspect includes the driving control device of any one of the first to the fifth aspect and a carwash machine. In the driving control system the processor in the driving control device controls the vehicle such that the vehicle withdraws from the car-washable area under autonomous driving, in a case in which car-washing of the vehicle by the carwash machine has been completed.

The driving control system of the eighth aspect enables delay to car-washing in a carwash machine to be suppressed by withdrawing the vehicle from the car-washable area under autonomous driving.

A driving control system of a ninth aspect includes the driving control device of any one of the first to the fifth aspect and a carwash machine. In the driving control system the processor in the driving control device notifies such that the vehicle is driven manually, in a case in which carwashing of the vehicle by the carwash machine has been completed.

The driving control system of the ninth aspect enables the vehicle to be withdrawn from the car-washable area at a timing desired by a driver.

The present disclosure enables delay to car-washing in a carwash machine to be suppressed by stopping a vehicle at an appropriate carwash position.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a driving control system of an exemplary embodiment of the present disclosure, with reference to the drawings.

Figure 1:
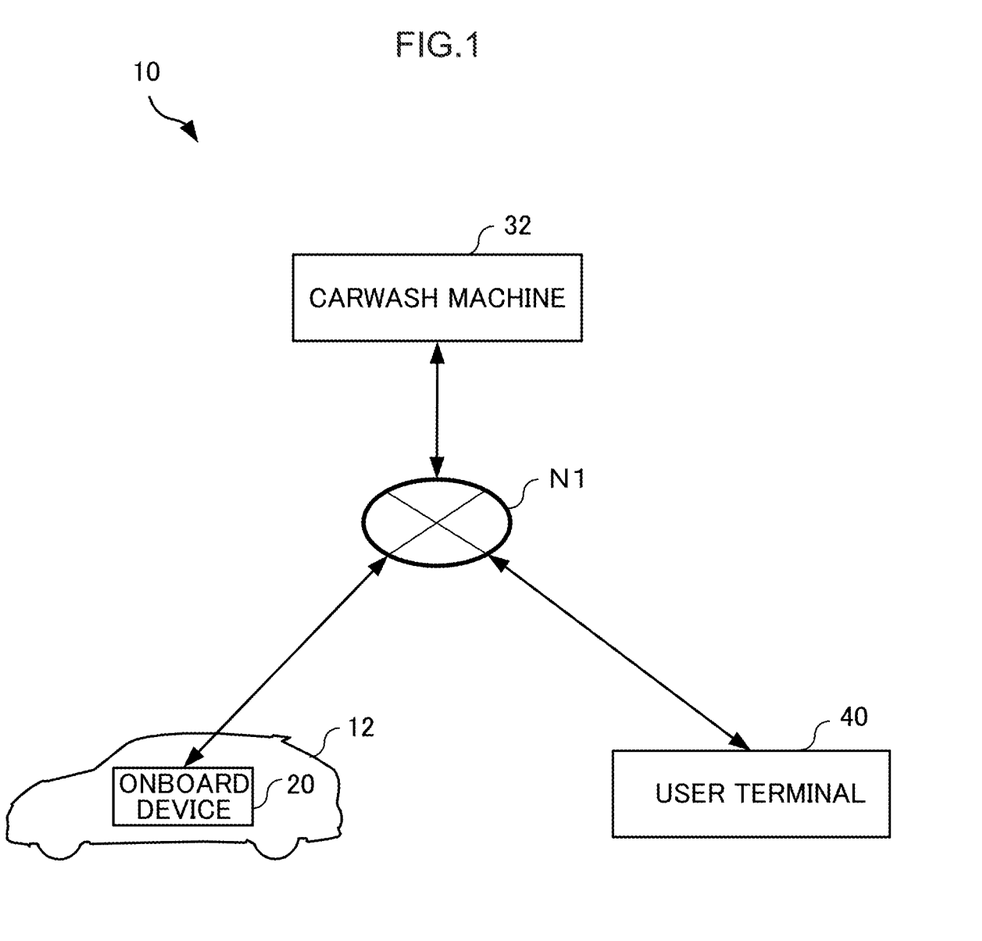
FIG. 1 is a diagram illustrating a schematic configuration of a driving control system according to an exemplary embodiment.

FIG. 1 is a block diagram illustrating a schematic configuration of a driving control system 10 according to the present exemplary embodiment.

Configuration

As illustrated in FIG. 1, the driving control system 10 according to the present exemplary embodiment includes a vehicle 12, a carwash machine 32, and a user terminal 40. The vehicle 12 includes an onboard device 20 serving as a driving control device. The onboard device 20, the carwash machine 32, and the user terminal 40 are connected to each other over a network N1.

The user terminal 40 is a smartphone or tablet terminal owned by an occupant of the vehicle 12 using the driving control system 10.

Figure 2:
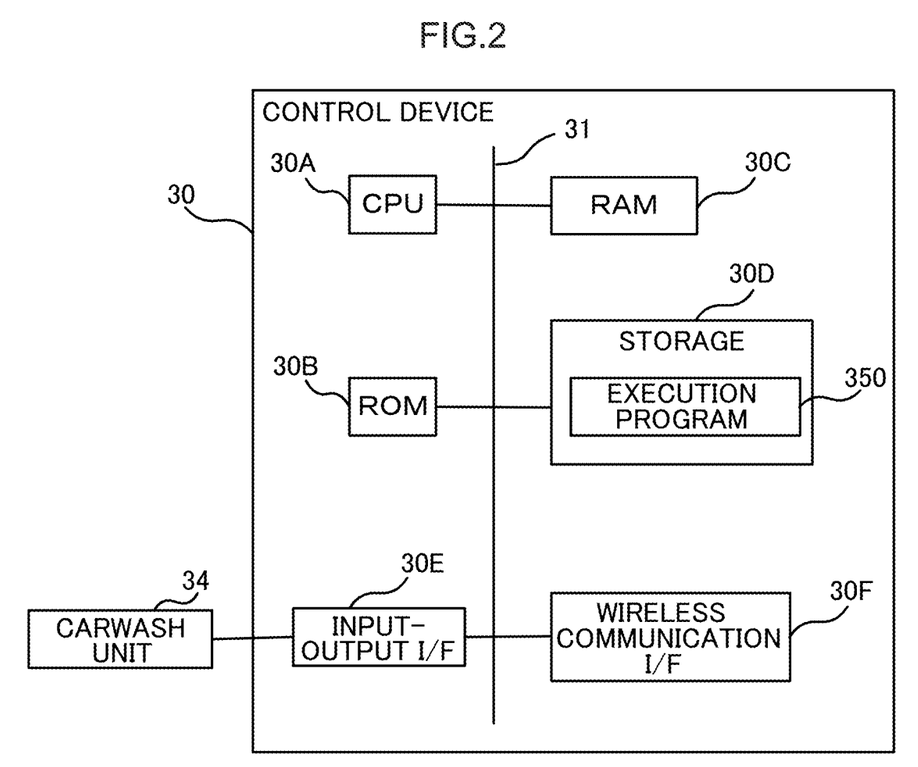
FIG. 2 is a block diagram illustrating a hardware configuration of a device installed in a carwash machine.

FIG. 2 is a block diagram illustrating a hardware configuration of a device installed in the carwash machine 32 of the present exemplary embodiment. The carwash machine 32 is configured including a control device 30 and a carwash unit 34.

The carwash unit 34 is an apparatus for cleaning a car-body surface of the vehicle 12. The carwash unit 34 includes brushes for removing dirt on the car-body surface, blowers for removing water droplets and the like from the car-body surface, a pump for supplying cleaning water, detergent, and the like, sensors for detecting the vehicle 12, and actuators and the like for adjusting the position of the brushes and blowers.

The control device 30 is configured including a central processing unit (CPU) 30A, read only memory (ROM) 30B, random access memory (RAM) 30C, storage 30D, an input-output interface (I/F) 30E, and a wireless communication I/F 30F. The CPU 30A, the ROM 30B, the RAM 30C, the storage 30D, the input-output I/F 30E, and the wireless communication I/F 30F are connected together through a bus 31 so as to be capable to communicate with each other. The CPU 30A is an example of a processor.

Figure 3:
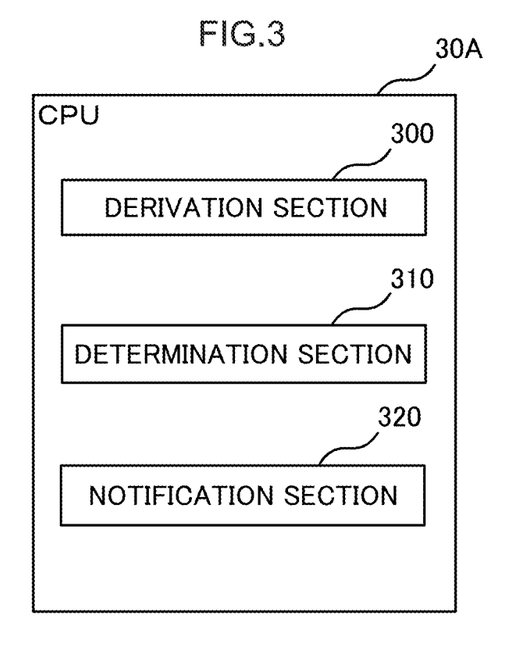
FIG. 3 is a block diagram illustrating an example of a functional configuration of a CPU in a control device.

The CPU 30A is a central processing unit that executes various programs to control each of the sections. Namely, the CPU 30A reads a program from the ROM 30B or the storage 30D, and executes the program using the RAM 30C as workspace. In the present exemplary embodiment an execution program 350, provided below, is stored in the storage 30D. By executing the execution program 350, the CPU 30A functions as a derivation section 300, a determination section 310, and a notification section 320 as illustrated in FIG. 3.

The ROM 30B is stored various programs and various data. The RAM 30C serves as workspace to temporarily store programs or data. The storage 30D serves as a storage section that is configured by a hard disk drive (HDD) or a solid state drive (SSD), and stores various programs including an operating system and various data. The storage 30D of the present exemplary embodiment stores the execution program 350.

The input-output I/F 30E is an interface for communication with each device installed in the carwash machine 32. The carwash unit 34 is connected to the onboard device 20 of the present exemplary embodiment through the input-output I/F 30E. The carwash unit 34 may be directly connected to the bus 31.

The wireless communication I/F 30F is an interface for communication with other devices, such as the vehicle 12, the user terminal 40, and the like, and, for example, employs a standard such as, for example, Ethernet (registered trademark), FDDI, or Wi-Fi (registered trademark).

The execution program 350 is a program for controlling the control device 30.

FIG. 3 is a block diagram illustrating an example of a functional configuration of the CPU 30A. As illustrated in FIG. 3, the CPU 30A includes the derivation section 300, the determination section 310, and the notification section 320. Each of the functional configurations is implemented by the CPU 30A reading the execution program 350 stored in the storage 30D and executing this program.

The derivation section 300 includes a function to derive information about a carwash position that is compatible with the vehicle 12 based on feature information, provided below, indicating features of the vehicle 12, this being information notified from the vehicle 12. Specifically, the derivation section 300 employs the feature information to identify the external profile of the vehicle 12. The derivation section 300 then computes the carwash position that is compatible with the vehicle 12 using the identified external profile of the vehicle 12.

The determination section 310 includes a function to determine whether or not the vehicle 12 is car-washable based on a vehicle state, this being information notified from the vehicle 12. The vehicle state referred to here is information indicating the state of each section of the vehicle 12, and examples thereof are an extended or closed state of door mirrors 25 and an open or closed state of door windows 26 of the vehicle 12. The determination section 310 determines the vehicle 12 to be car-washable, in a case in which the door mirrors 25 and the door windows 26 of the vehicle 12 are closed, and determines the vehicle 12 not to be car-washable, in a case in which the door mirrors 25 of the vehicle 12 are extended or the door windows 26 are open.

The notification section 320 includes a function to notify the vehicle 12 through the wireless communication I/F 30F with information about a carwash position that is compatible with the vehicle 12 derived by the derivation section 300. Moreover, the notification section 320 includes a function to provide notification to ensure that the vehicle 12 through the wireless communication I/F 30F of a requirement to close any of the door mirrors 25 or the door windows 26 that are extended/open (hereinafter called a "carwash requirement"), in a case in which the determination section 310 has determined the vehicle 12 not to be car-washable.

Moreover, the notification section 320 includes a function to provide notification to ensure that the vehicle 12 through the wireless communication I/F 30F to make the vehicle 12 withdraw from the car-washable area, in a case in which the carwash unit 34 has completed car-washing of the vehicle 12.

Figure 4:
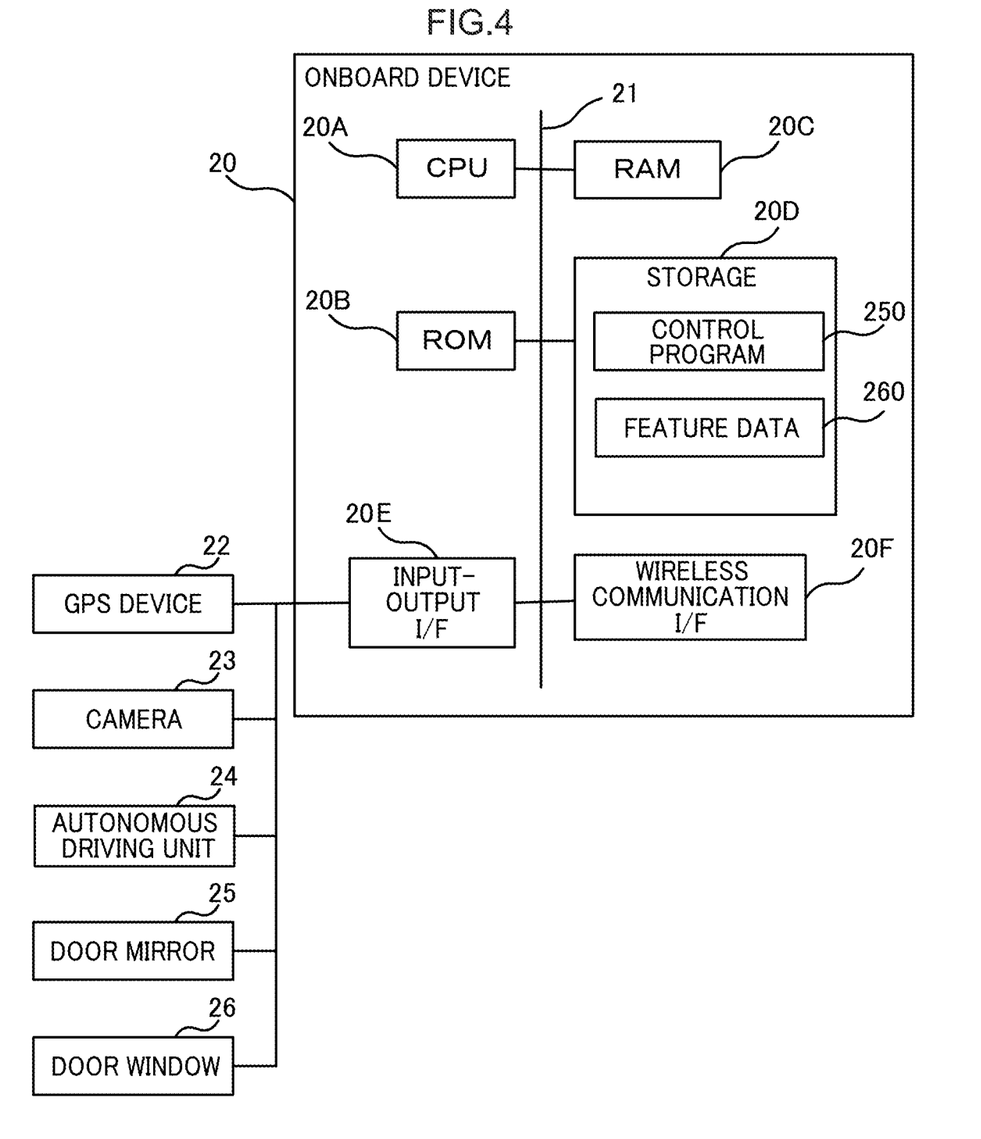
FIG. 4 is a block diagram illustrating a hardware configuration of device installed onboard a vehicle.

FIG. 4 is a block diagram illustrating a hardware configuration of a device installed onboard the vehicle 12 of the present exemplary embodiment.

A GPS device 22 is a device to acquire positional information of the vehicle 12.

A camera 23 is a vehicle exterior camera also serving as a sensor of an autonomous driving unit 24, and is an imaging device provided toward the front of the vehicle 12.

The autonomous driving unit 24 is a unit to enable the vehicle 12 to move autonomously by performing driving operations related to acceleration, steering, and braking based on information from external sensors such as the camera 23, millimeter wave radar, light detection and ranging (LIDAR), and the like.

The onboard device 20 is configured including a CPU 20A, ROM 20B, RAM 20C, storage 20D, an input-output I/F 20E, and a wireless communication I/F 20F. The CPU 20A, the ROM 20B, the RAM 20C, the storage 20D, and the input-output I/F 20E, and the wireless communication I/F 20F are connected together through a bus 21 so as to be capable to communicate with each other. The CPU 20A is an example of a processor.

Figure 5:
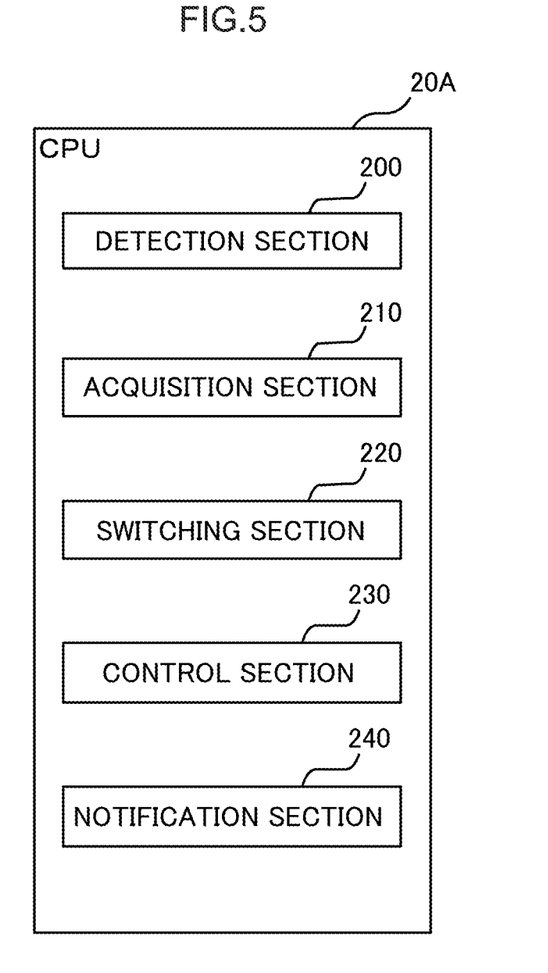
FIG. 5 is a block diagram illustrating an example of a functional configuration of a CPU of an onboard device.

The CPU 20A is a central processing unit that executes various programs to control each of the sections. Namely, the CPU 20A reads a program from the ROM 20B or the storage 20D and executes the program using the RAM 20C as a workspace. In the present exemplary embodiment a control program 250 is stored is the storage 20D as a driving control program. By executing the control program 250, the CPU 20A functions as a detection section 200, an acquisition section 210, a switching section 220, a control section 230, and a notification section 240 as illustrated in FIG. 5.

The ROM 20B is stored various programs and various data. The RAM 20C serves as a workspace to temporarily store programs and data. The storage 20D serves as a storage section that is configured by a hard disk drive (HDD) or a solid state drive (SSD), and stores various programs including an operating system and various data. The storage 20D of the present exemplary embodiment is stored with the control program 250 and feature data 260.

The input-output I/F 20E is an interface for communication with each device installed to the vehicle 12. The GPS device 22, the camera 23, the autonomous driving unit 24, the door mirrors 25, and the door windows 26 are connected through the input-output I/F 20E to the onboard device 20 of the present exemplary embodiment. The GPS device 22, the camera 23, the autonomous driving unit 24, the door mirrors 25, and the door windows 26 may be directly connected to the bus 21.

The wireless communication I/F 20F is an interface for communication with other devices, such as the carwash machine 32 and the user terminal 40 and, for example, employs a standard such as Ethernet (registered trademark), FDDI, or Wi-Fi (registered trademark).

The control program 250 is a program for controlling the onboard device 20.

The feature data 260 is stored, as feature information, with features of the vehicle 12, such as whether or not there is a spoiler, a corner pole, a roof rail, or a rear mirror, a vehicle size class, a car model, dimensions, and the like.

FIG. 5 is a block diagram illustrating an example of a functional configuration of the CPU 20A. As illustrated in FIG. 5, the CPU 20A includes the detection section 200, the acquisition section 210, the switching section 220, the control section 230, and the notification section 240. These functional configurations are implemented by the CPU 20A reading the control program 250 stored in the storage 20D, and executing the control program 250.

The detection section 200 includes a function to detect whether the vehicle 12 has encroached into an area within which a vehicle can be washed by the carwash machine 32 (hereafter, referred to as a "car-washable area"). Specifically, on receipt of a message via the input-output I/F 20E that the camera 23 has recognized an auxiliary marker for distance provided at the carwash machine 32, the detection section 200 detects whether or not the vehicle 12 has encroached into the car-washable area.

The detection section 200 includes a function to detect whether or not the vehicle 12 has stopped at a position displaced from the carwash position. Specifically, the detection section 200 detects whether or not the vehicle 12 has stopped at a position displaced from the carwash position by receiving an image captured by the camera 23 via the input-output I/F 20E. The detection section 200 may be configured so as to detect whether or not the vehicle 12 has stopped at a position displaced from the carwash position by receiving a stop position of the vehicle 12 from the GPS device 22 via the input-output I/F 20E.

The acquisition section 210 includes a function to acquire displacement information relating to displacement between the vehicle 12 and the carwash position in a case in which the vehicle 12 has stopped at a position displaced from the carwash position. Detailed explanation will be provided below regarding the displacement information. Specifically, the acquisition section 210 receives a stop position of the vehicle 12 from the GPS device 22 via the input-output I/F 20E in a case in which the detection section 200 has detected that the vehicle 12 has stopped at a position displaced from the carwash position. Then, using the received stop position of the vehicle 12, the acquisition section 210 then acquires displacement information about displacement between the stop position of the vehicle 12 and the carwash position.

The acquisition section 210 also includes a function to acquire information about the carwash position that is compatible with the vehicle 12 from the carwash machine 32 via the wireless communication I/F 20F.

The switching section 220 includes a function to switch a travel mode of the vehicle 12 to autonomous driving. Specifically, the switching section 220 starts control of the autonomous driving unit 24, in a case in which the detection section 200 has detected that the vehicle 12 has encroached into the car-washable area.

Moreover, the switching section 220 includes a function to switch the travel mode of the vehicle 12 from autonomous driving to manual driving, in a case in which the vehicle 12 has stopped at a position displaced from the carwash position. Specifically, the switching section 220 halts control of the autonomous driving unit 24, in a case in which the displacement acquired by the acquisition section 210 is less than a predetermined threshold.

The control section 230 includes a function to control the vehicle 12 so as to stop at the carwash position under autonomous driving. In the present exemplary embodiment, the control section 230 controls the vehicle 12 so as to stop at the carwash position under autonomous driving based on the displacement information acquired by the acquisition section 210. The displacement information referred to here is information regarding a difference between the stop position of the vehicle 12 and the carwash position expressed as coordinates in a vehicle front-rear direction and in a vehicle width direction. The control section 230 transmits an instruction to the autonomous driving unit 24 instructing the vehicle 12 to move a distance corresponding to the difference between the stop position of the vehicle 12 and the carwash position according to the displacement information acquired by the acquisition section 210. The control section 230 includes a function to control to make the vehicle 12 withdraw from the car-washable area under autonomous driving. In the present exemplary embodiment, the control section 230 transmits an instruction to the autonomous driving unit 24 so as to withdraw the vehicle 12 from the car-washable area in a case in which car-washing of the vehicle 12 has been completed.

The notification section 240 includes a function to read feature information from the feature data stored in the storage 20D, and to notify the carwash machine 32 of the read feature information via the wireless communication I/F 20F.

The notification section 240 includes a function to provides notification to ensure that the vehicle 12 is driven to the carwash position under manual driving in a case in which the vehicle 12 has stopped at a position displaced from the carwash position. Specifically, the notification section 240 transmits a message to perform manual driving to the user terminal 40 via the wireless communication I/F 20F in a case in which the detection section 200 has detected that the vehicle 12 has stopped at a position displaced from the carwash position. A configuration may be adopted in which the notification section 240 transmits a message to perform manual driving via the input-output I/F 20E to a touch panel liquid crystal display or the like provided on a center console or on a dashboard of the vehicle 12.

Processing Flow

Figure 6:
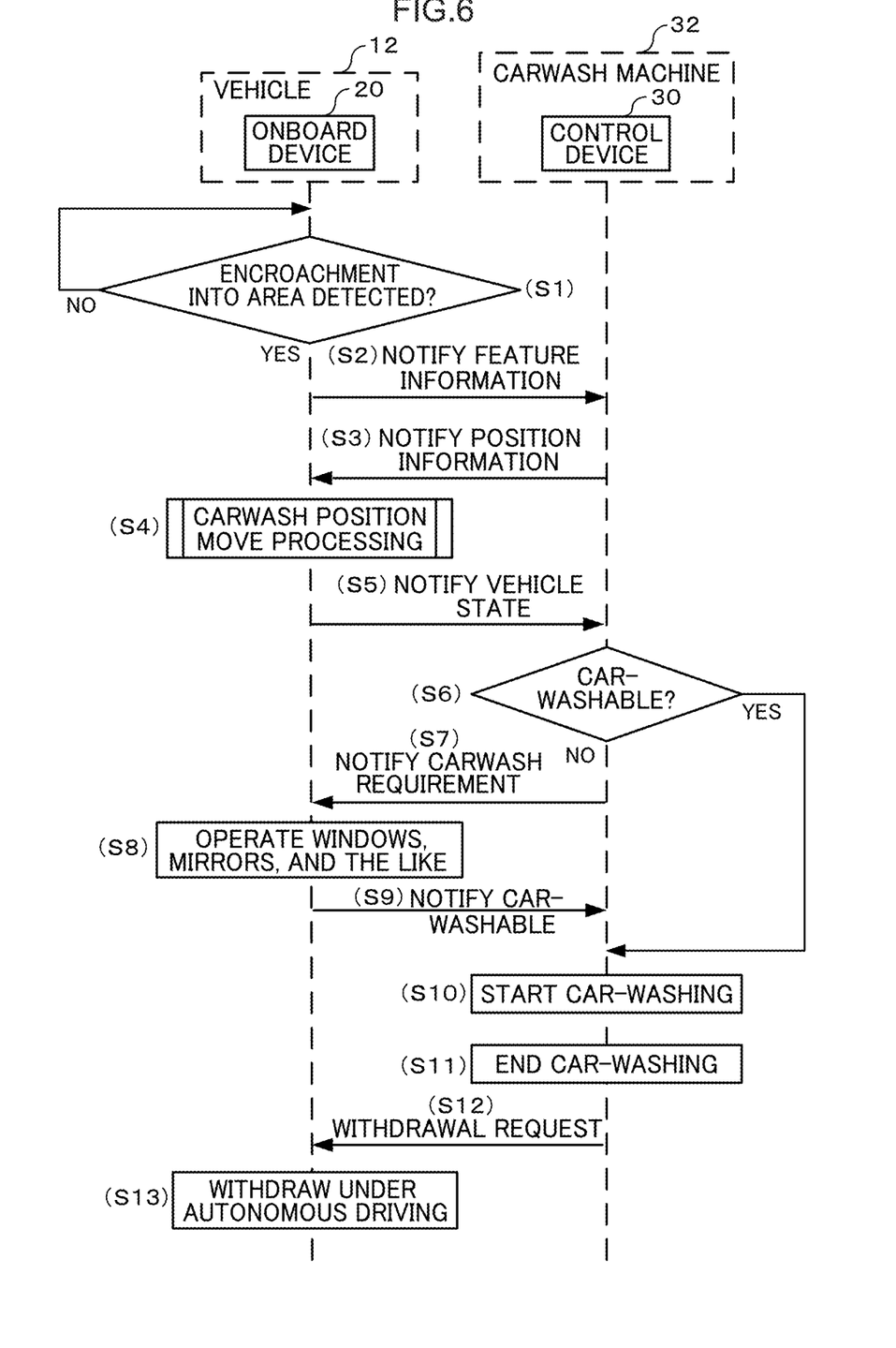
FIG. 6 is a sequence diagram illustrating a flow of processing in a driving control system according to a first exemplary embodiment.

Next, description follows regarding a flow of processing in the driving control system 10 according to the present exemplary embodiment, with reference to the sequence diagram of FIG. 6.

At step S1 of FIG. 6, the onboard device 20 is on standby to detect whether the vehicle 12 has encroached into the car-washable area. Processing transitions to step S2, in a case in which the onboard device 20 has detected that the vehicle 12 has encroached into the car-washable area (step S1: YES).

At step S2, the onboard device 20 reads the feature information from the feature data stored in the storage 20D, and notifies the control device 30 of the read feature information via the wireless communication I/F 20F.

A configuration may be adopted in which, in a case in which a sensor provided to the carwash machine 32 has detected that the vehicle 12 has encroached into the car-washable area, the control device 30 requests feature information from the onboard device 20, and the onboard device 20 that has received this request notifies the feature information to the control device 30.

At step S3, the control device 30 derives information about the carwash position compatible with the vehicle 12 based on the feature information, and notifies the vehicle of the derived carwash position information. Specifically, the control device 30 identifies an external profile of the vehicle 12 using the feature information notified from the onboard device 20. The control device 30 then computes a carwash position using the identified external profile of the vehicle 12, and notifies the onboard device 20 of the computed carwash position information.

At step S4, the onboard device 20 executes carwash position move processing. The carwash position move processing is provided below in detail. The carwash position move processing enables the vehicle 12 to stop at the carwash position.

At step S5, the onboard device 20 notifies the control device 30 with information that the vehicle 12 has stopped and with a vehicle state.

As step S6, the control device 30 determines whether or not the vehicle 12 is car-washable from the vehicle state as notified from the onboard device 20. The control device 30 transitions to step S10, in a case in which the vehicle 12 is determined to be car-washable (step S6: YES). However, the control device 30 transitions to step S7, in a case in which the vehicle 12 is determined not to be car-washable (step S6: NO).

At step S7, the control device 30 provides notification to ensure that a carwash requirement to the onboard device 20.

At step S8, based on the provided carwash requirement, the onboard device 20 executes control so as to close the door mirrors 25, in a case in which the door mirrors 25 are extended, and to close the door windows 26, in a case in which the door windows 26 are open.

At step S9, the onboard device 20 notifies the onboard device 20 with a car-washing permission notification indicating that the vehicle 12 is in a car-washable state.

At step S10, the control device 30 controls the carwash unit 34 and performs car-washing on the vehicle 12.

At step S11, the control device 30 ends car-washing, in a case in which a command notification has been received from the carwash unit 34 that car-washing of the vehicle 12 has been completed.

At step S12, the control device 30 provides notification to ensure that the vehicle 12 of a withdrawal request requesting the vehicle 12 to withdraw from the car-washable area.

At step S13, the onboard device 20 transmits an instruction to the autonomous driving unit 24 so as to withdraw the vehicle 12 from the car-washable area.

Figure 7:
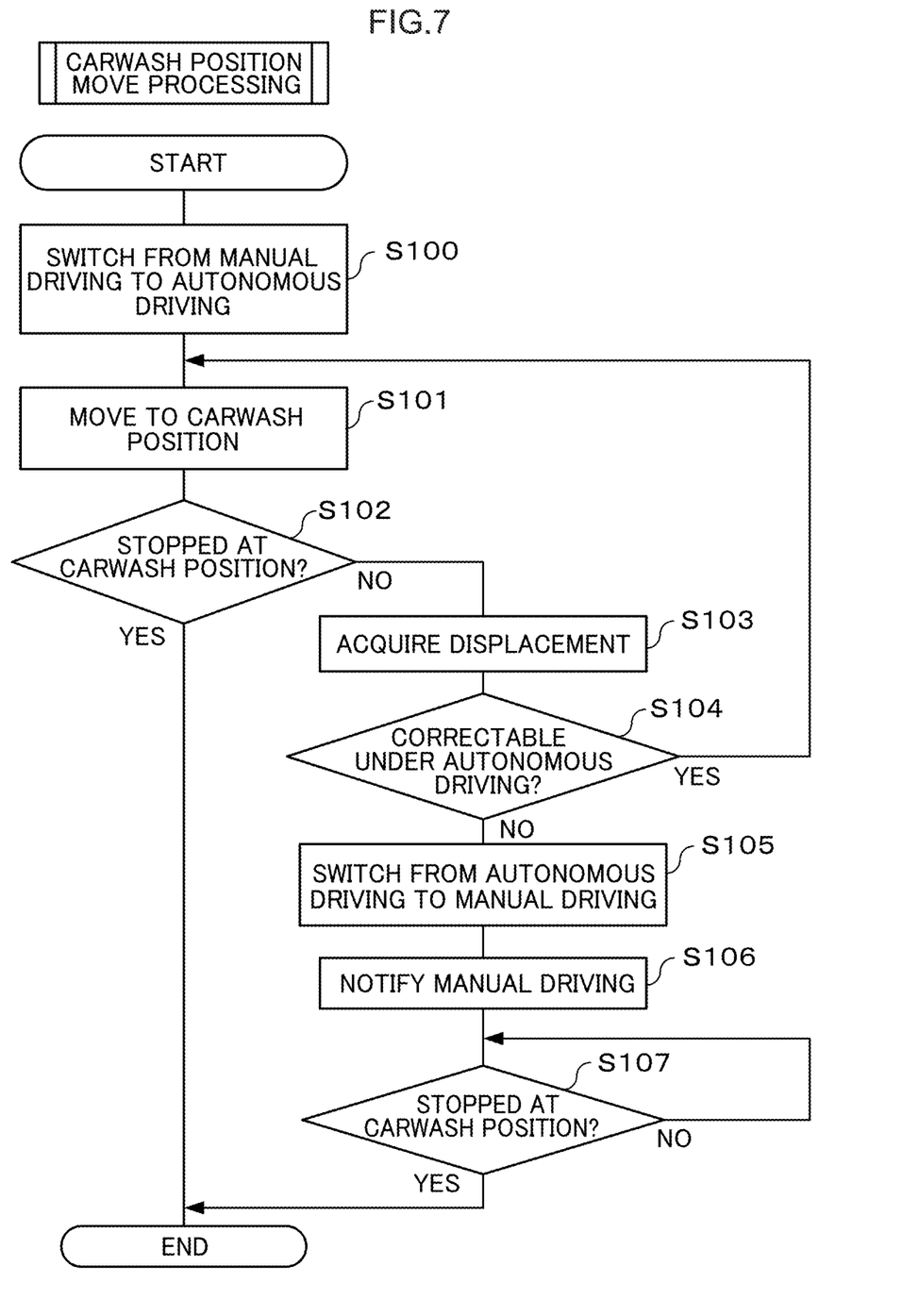
FIG. 7 is a flowchart illustrating an example of a flow of carwash position move processing performed by an onboard device according to an exemplary embodiment.

Next, description follows regarding carwash position move processing executed by the CPU 20A of the onboard device 20 reading the control program 250, with reference to FIG. 7.

At step S100 of FIG. 7, the CPU 20A switches the travel mode of the vehicle 12 from manual driving to autonomous driving. Specifically, the CPU 20A starts control of the autonomous driving unit 24.

At step S101, the CPU 20A transmits an instruction to the autonomous driving unit 24 to make the vehicle 12 to move to the carwash position.

At step S102, the CPU 20A determines whether or not the vehicle 12 has stopped at the carwash position. Specifically, the CPU 20A determines whether or not the vehicle 12 has stopped at a position displaced from the carwash position by receiving an image captured by the camera 23 via the input-output I/F 20E. The CPU 20A ends carwash position move processing, in a case in which the vehicle 12 has been determined to have stopped at the carwash position (step S102: YES). However, the CPU 20A transitions to step S103, in a case in which determination is made that the vehicle 12 has stopped at a position displaced from the carwash position (step S102: NO).

At step S103, the CPU 20A acquires displacement information. Specifically, the CPU 20A receives a stop position of the vehicle 12 from the GPS device 22 via the input-output I/F 20E. Using the received stop position of the vehicle 12 the CPU 20A then acquires a displacement between the stop position of the vehicle 12 and the carwash position. Determination as to whether or not the vehicle 12 has stopped at a position displaced from the carwash position may be determined by the control device 30. In such cases the CPU 20A acquires the displacement information by the displacement information being transmitted from the control device 30 to the onboard device 20.

At step S104, the CPU 20A determines from the acquired displacement information whether or not this displacement is able to be corrected by the vehicle 12 under autonomous driving. Specifically, the CPU 20A determines whether or not the displacement acquired at step S103 is a predetermined threshold or greater. The CPU 20A returns to step S101, in a case in which determination is made that this displacement is able to be corrected by the vehicle 12 under autonomous driving, in other words, in a case in which the displacement is the predetermined threshold or greater (step S104: YES). However, the CPU 20A transitions to step S105, in a case in which determination is made that this displacement is able to be corrected by the vehicle 12 under autonomous driving, in other words, in a case in which the displacement is less than the predetermined threshold (step S104: NO). The threshold for determination is set in consideration of detection precision by the camera 23 or by an external sensor such as a millimeter wave radar or LIDAR, and in consideration of control procession of the vehicle 12 under autonomous driving.

At step S105, the CPU 20A switches the travel mode of the vehicle 12 from autonomous driving to manual driving. In other words, the CPU 20A halts control of the autonomous driving unit 24.

At step S106, the CPU 20A provides notification to ensure that the user terminal 40 to perform manual driving via the wireless communication I/F 20F.

At step S107 the CPU 20A executes similar processing to that of step S102. The CPU 20A ends the carwash position move processing, in a case in which the vehicle 12 has been determined to have stopped at the carwash position (step S107:YES). However, the CPU 20A repeatedly executes the processing of step S107, in a case in which the vehicle 12 has been determined to have stopped at a position displaced from the carwash position (step S107:NO).

First Exemplary Embodiment Summary

The driving control system 10 of the present exemplary embodiment described above enables delay to car-washing in the carwash machine 32 to be suppressed by stopping the vehicle 12 at the appropriate carwash position.

In the onboard device 20 of the present exemplary embodiment the acquisition section 210 acquires the displacement information relating to displacement between the vehicle 12 and the carwash position, in a case in which the detection section 200 has detected the vehicle 12 to have stopped at a position displaced from the carwash position. The control section 230 then transmits an instruction to the autonomous driving unit 24 so as to move the vehicle 12 a distance corresponding to the difference between the stop position of the vehicle 12 and the carwash position according to the acquired displacement information. This thereby enables correction of the carwash position even in a case in which the vehicle 12 has stopped at a position displaced from the carwash position.

Moreover, in the onboard device 20 according to the present exemplary embodiment the notification section 240 includes a function to notify the carwash machine 32 of feature information read from the feature data stored in the storage 20D, and to acquire information about the carwash position that is compatible with the vehicle 12 derived by the control device 30 based feature information. This thereby enables the carwash machine 32 to be operated more certainly.

Moreover, in the onboard device 20 of the present exemplary embodiment the switching section 220 halts control of the autonomous driving unit 24, in a case in which the displacement acquired by the acquisition section 210 is less than the predetermined threshold. This accordingly enables the vehicle 12 to be moved to the carwash position by manual driving even in a case in which the vehicle 12 was unable to be stopped at the carwash position under autonomous driving.

Moreover, in the onboard device 20 of the present exemplary embodiment the notification section 240 transmits a message to perform manual driving to the user terminal 40 via the wireless communication I/F 20F, in a case in which the detection section 200 has detected that the vehicle 12 has stopped at a position displaced from the carwash position. This enables moving to the carwash position under manual driving to be prompted even in a case in which the vehicle 12 was unable to be stopped at the carwash position under autonomous driving.

Second Exemplary Embodiment

In the first exemplary embodiment the onboard device 20 transmits an instruction to the autonomous driving unit 24 so as to withdraw the vehicle 12 from the car-washable area, in a case in which car-washing of the vehicle 12 has been completed. In the second exemplary embodiment the onboard device 20 provides notification to ensure that the vehicle 12 is driven manually, in a case in which carwashing of the vehicle 12 has been completed. Explanation follows regarding points of difference to the first exemplary embodiment. A hardware configuration is the same as that of the first exemplary embodiment, and so explanation thereof will be omitted.

The flow of processing in the driving control system 10 of the present exemplary embodiment will now be explained, with reference to FIG. 8. Steps executing the same processing to that in the flow of processing in the driving control system 10 illustrated in FIG. 6 are appended with the same step numbers to those in FIG. 6, and explanation thereof will be omitted.

Figure 8:
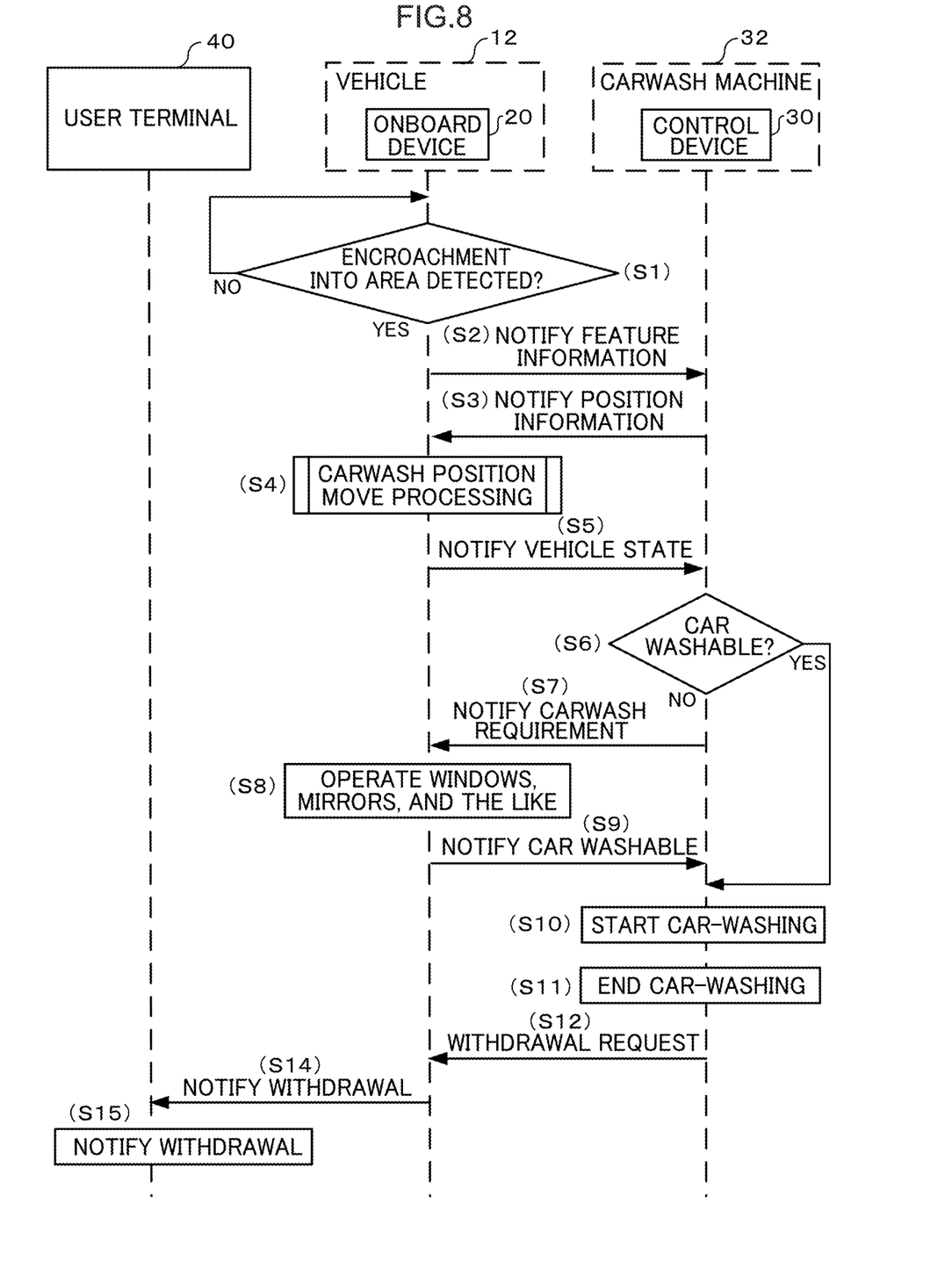
FIG. 8 is a sequence diagram illustrating a flow of processing in a driving control system according to a second exemplary embodiment.

The flow of processing in the driving control system 10 as illustrated in FIG. 6 and the flow of processing in the driving control system 10 as illustrated in FIG. 8 differ in the point that processing of step S14 and step S15 is applied instead of the processing of step S13.

At step S14 of FIG. 8, the onboard device 20 provides notification to ensure that the user terminal 40 via the wireless communication I/F 20F so as to withdraw the vehicle 12 from the car-washable area under manual driving. The onboard device 20 may be configured so as to make the notification to withdraw under manual driving to a touch panel liquid crystal display or the like provided in the vehicle 12.

At step S15, a CPU provided to the user terminal 40 presents a message so as to withdraw the vehicle 12 from the car-washable area under manual driving via a speaker or a screen etc.

Remarks

The driving control system 10 of the present exemplary embodiment is applied to an embodiment in which the onboard device 20 is inbuilt into the vehicle 12. However, the onboard device 20 may be installed externally to the vehicle 12. The onboard device 20 in such cases controls the autonomous driving unit 24 and the like over a network N1.

Note that carwash position move processing of the exemplary embodiment described above executed by the CPU reading software (a program) may be executed by various processors other than a CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Moreover, the carwash position move processing may be executed by any one of these various types of processors, or may be executed by a combination of two or more of the same type or different types of processors (for example by plural FPGAs, or a combination of a CPU and an FPGA). The hardware structure of these various types of processors is more specifically an electric circuit combining circuit elements such as semiconductor elements.

Moreover, in the present exemplary embodiment although an embodiment has been explained in which the control program 250 is pre-stored (installed) in the storage 20D, there is no limitation thereto. The program may be provided in a format recorded on a recording medium, such as a compact disc read only memory (CD-ROM), a digital versatile disc read only memory (DVD-ROM), or a universal serial bus (USB) memory or the like. The program may also be in a format downloadable from an external device via a network.

The flows of processing explained for the exemplary embodiments described above are also merely examples thereof, and redundant steps may be deleted, new steps may be added, and the processing sequence may be changed within a range not departing from the spirit of the present disclosure.

Moreover, each of the configurations of the onboard device, the carwash machine, and the user terminal explained in the exemplary embodiments described above are merely examples thereof, and may be modified according to circumstances within a range not departing from the spirit of the present disclosure.

What is claimed is:

1. A driving control device, comprising a processor, the processor being configured to:
    detect that a vehicle has encroached into an area configured for car-washing by a carwash machine,
    switch a travel mode of the vehicle to autonomous driving, and
    control the vehicle so as to stop at a carwash position for the carwash machine under autonomous driving,
    wherein the processor is further configured to:
        in response to the vehicle being stopped at a position displaced from the carwash position, acquire displacement information relating to displacement between the vehicle and the carwash position,
        determine, from the displacement information, whether or not the displacement is equal to or greater than a predetermined threshold,
        in response to the displacement being equal to or greater than the predetermined threshold, control the vehicle based on the displacement to move to the carwash position under the autonomous driving, and
        in response to the displacement being less than the predetermined threshold, switch the travel mode of the vehicle from the autonomous driving to manual driving.

2. The driving control device of claim 1, wherein the processor is further configured to:
    notify the carwash machine of feature information indicating features of the vehicle, and
    acquire, from the carwash machine, information derived based on the feature information as information regarding the carwash position that is compatible with the vehicle.

3. The driving control device of claim 1, wherein the processor is further configured to: in response to the travel mode of the vehicle having been switched from the autonomous driving to the manual driving, provide notification to ensure that the vehicle is driven to the carwash position manually.

4. A non-transitory storage medium storing a driving control program that causes, when executed by a computer, the computer to execute processing comprising:
    detecting that a vehicle has encroached into an area configured for car-washing by a carwash machine;
    switching a travel mode of the vehicle to autonomous driving; and
    controlling the vehicle so as to stop at a carwash position for the carwash machine under autonomous driving,
    wherein the processing includes:
        in response to the vehicle being stopped at a position displaced from the carwash position, acquiring displacement information relating to displacement between the vehicle and the carwash position, determining, from the displacement information, whether or not the displacement is equal to or greater than a predetermined threshold, in response to the displacement being equal to or greater than the predetermined threshold, controlling the vehicle based on the displacement to move to the carwash position under the autonomous driving, and in response to the displacement being less than the predetermined threshold, switching the travel mode of the vehicle from the autonomous driving to manual driving.

5. A driving control system, comprising: a driving control device and a carwash machine, wherein the driving control device includes a processor configured to:

detect that a vehicle has encroached into an area configured for car-washing by a carwash machine, switch a travel mode of the vehicle to autonomous driving, and control the vehicle so as to stop at a carwash position for the carwash machine under autonomous driving, the processor is further configured to:

in response to the vehicle being stopped at a position displaced from the carwash position, acquire displacement information relating to displacement between the vehicle and the carwash position, determine, from the displacement information, whether or not the displacement is equal to or greater than a predetermined threshold, in response to the displacement being equal to or greater than the predetermined threshold, control the vehicle based on the displacement to move to the carwash position under the autonomous driving, and in response to the displacement being less than the predetermined threshold, switch the travel mode of the vehicle from the autonomous driving to manual driving, and the carwash machine is configured to notify the vehicle of information derived based on feature information indicating features of the vehicle as information regarding a carwash position that is compatible with the vehicle.

6. The driving control system according to claim 5, wherein:

the processor in the driving control device is configured to, in response to the car-washing of the vehicle by the carwash machine having been completed, control the vehicle such that the vehicle withdraws from the area under the autonomous driving.

7. The driving control system according to claim 5, wherein:

the processor in the driving control device is configured to, in response to the car-washing of the vehicle by the carwash machine having been completed, provide notification to ensure that the vehicle is driven manually.

8. The driving control system of claim 5, wherein the carwash machine includes a processor configured to:

identify an external profile of the vehicle using the feature information, and determine the carwash position using the identified external profile of the vehicle.

9. The driving control system of claim 8, wherein the processor in the driving control device is further configured to, in response to the travel mode of the vehicle having been switched from the autonomous driving to the manual driving, provide a first notification to a user terminal owned by an occupant of the vehicle to ensure that the vehicle is driven to the carwash position manually.

10. The driving control system of claim 9, wherein the processor in the driving control device is configured to, in response to the car-washing of the vehicle by the carwash machine having been completed, control the vehicle such that the vehicle withdraws from the area under the autonomous driving.

11. The driving control system of claim 9, wherein the processor in the driving control device is configured to, in response to the car-washing of the vehicle by the carwash machine having been completed, provide a second notification to the user terminal to ensure that the vehicle withdraws from the area under the manual driving.

\* \* \* \* \*